US011428791B1

(12) United States Patent
Fu

(10) Patent No.: US 11,428,791 B1
(45) Date of Patent: Aug. 30, 2022

(54) DUAL-MODE SILICON PHOTOMULTIPLIER BASED LIDAR

(71) Applicant: Motional AD LLC, Boston, MA (US)

(72) Inventor: Geng Fu, Belmont, MA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/501,342

(22) Filed: Oct. 14, 2021

(51) Int. Cl.
  *G01S 7/4861* (2020.01)
  *G01S 7/481* (2006.01)
  *G01T 1/164* (2006.01)

(52) U.S. Cl.
  CPC .......... *G01S 7/4861* (2013.01); *G01S 7/4816* (2013.01); *G01T 1/1645* (2013.01); *H01J 2237/2445* (2013.01)

(58) Field of Classification Search
  CPC ... G01S 7/4861; G01S 7/4816; G01T 1/1645; H01J 2237/2445
  USPC ......................................................... 313/532
  See application file for complete search history.

(56) References Cited

U.S. PATENT DOCUMENTS

| | | | | |
|---|---|---|---|---|
| 9,271,694 | B2* | 3/2016 | Kim | G01T 1/248 |
| 9,658,158 | B2* | 5/2017 | Renna | G01N 21/6454 |
| 10,901,074 | B1* | 1/2021 | Pan | G01S 17/89 |
| 2011/0147567 | A1* | 6/2011 | Grazioso | H01L 27/14609 |
| | | | | 250/208.1 |
| 2012/0068050 | A1* | 3/2012 | Mazzillo | H01L 27/14658 |
| | | | | 250/208.1 |
| 2015/0168567 | A1* | 6/2015 | Kim | G01T 1/248 |
| | | | | 250/370.11 |
| 2018/0102442 | A1* | 4/2018 | Wang | H01L 31/02 |
| 2018/0164416 | A1* | 6/2018 | Ekengren | G01S 17/10 |
| 2018/0259625 | A1* | 9/2018 | Gnecchi | G01S 7/4863 |
| 2019/0082128 | A1* | 3/2019 | Oh | H04N 5/378 |
| 2019/0182415 | A1* | 6/2019 | Sivan | G06F 3/012 |
| 2019/0288132 | A1* | 9/2019 | Wang | H01L 31/0232 |

(Continued)

FOREIGN PATENT DOCUMENTS

KR    101936193     1/2019
WO    WO 2006/073875    7/2006
(Continued)

OTHER PUBLICATIONS

Ravil Agishev, Adolfo Comerón, Jordi Bach, Alejandro Rodriguez, Michaël Sicard, Jordi Riu, Santiago Royo, Lidar with SiPM: Some capabilities and limitations in real environment, Optics & Laser Technology, vol. 49, (Year: 2013).*

(Continued)

*Primary Examiner* — David P Porta
*Assistant Examiner* — Gisselle M Gutierrez
(74) *Attorney, Agent, or Firm* — Fish & Richardson P.C.

(57) ABSTRACT

Provided is a silicon photomultiplier (SiPM) device and a silicon photomultiplier based LiDAR. The SiPM device includes a first sub-region and a second sub-region. In the first sub-region, the photodiode is operated with a first internal gain. In the second sub-region, the photodiode is operated with a second internal gain and the second internal gain in smaller than the first internal gain. A first anode generates current from the first sub-region in response to a low flux event, and the second anode generates current from the second sub-region in response to a high flux event. A common cathode outputs current generated from the first sub-region or the second sub-region.

22 Claims, 10 Drawing Sheets

(56) References Cited

U.S. PATENT DOCUMENTS

| | | | |
|---|---|---|---|
| 2020/0075652 A1 | 3/2020 | Chen et al. | |
| 2020/0110159 A1* | 4/2020 | Wohlgenannt | ........ G01S 7/4817 |
| 2020/0116559 A1 | 4/2020 | Pacala et al. | |
| 2021/0109199 A1 | 4/2021 | Hennecke et al. | |
| 2021/0278257 A1 | 9/2021 | Dharia et al. | |
| 2021/0293931 A1* | 9/2021 | Nemet | ............... G02B 26/0833 |
| 2021/0325541 A1 | 10/2021 | Kim et al. | |
| 2021/0389467 A1* | 12/2021 | Eshel | .................... G01S 17/003 |

FOREIGN PATENT DOCUMENTS

| | | |
|---|---|---|
| WO | WO 2018/162632 | 9/2018 |
| WO | WO 2020/033749 | 2/2020 |

OTHER PUBLICATIONS

Gnecchi, Salvatore, and Carl Jackson. "A 1×16 SiPM array for automotive 3D imaging LiDAR systems." In Proceedings of the 2017 International Image Sensor Workshop (IISW), Hiroshima, Japan, pp. 133-136. 2017. (Year: 2017).*

Villa, Federica A., Fabio Severini, Francesca Madonini and Franco Zappa. "SPADs and SiPMs Arrays for Long-Range High-Speed Light Detection and Ranging (LiDAR)." Sensors (Basel, Switzerland) 21 (2021): n. pag. (Year: 2021).*

Gnecchi, Salvatore, Colin Barry, Stephen J. Bellis and Steven J. Buckley. "Long Distance Ranging Performance of Gen3 LiDAR Imaging System based on 1×16 SiPM Array." (2019). (Year: 2019).*

Acerbi et al., "Understanding and simulating SiPMs," Nuclear Instruments and Methods in Physics Research Section A: Accelerators, Spectrometers, Detectors and Associated Equipment, May 11, 2019, 926:16-35.

Dolinsky et al., "Timing resolution performance comparison for fast and standard outputs of SensL SiPM." 2013 IEEE Nuclear Science Symposium and Medical Imaging Conference, Oct. 27, 2013, 6 pages.

* cited by examiner

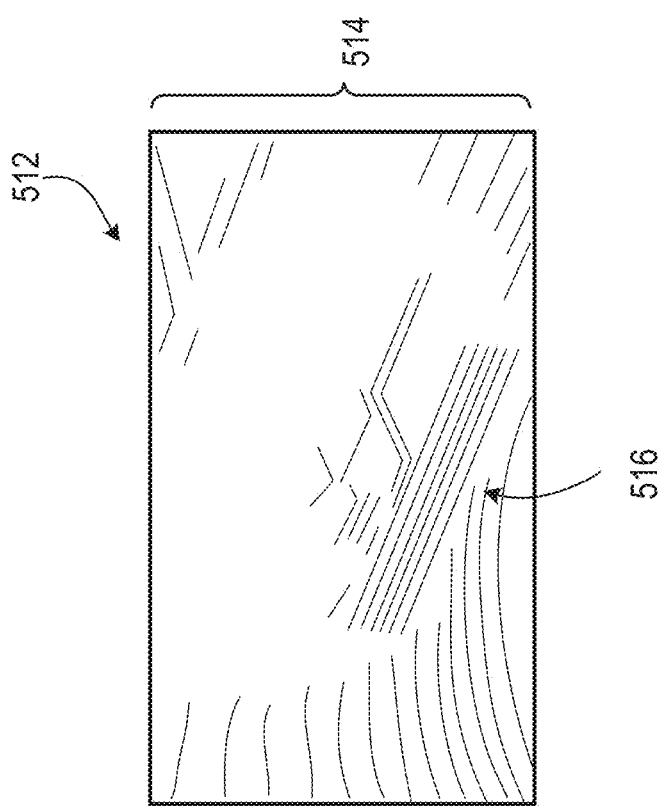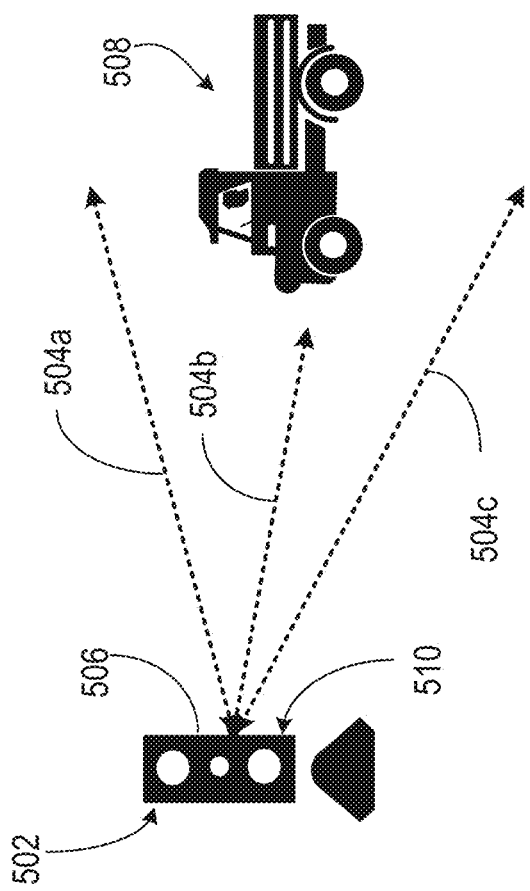
FIG. 5

DUAL-MODE SILICON PHOTOMULTIPLIER BASED LIDAR

BACKGROUND

Laser Detection and Ranging (LiDAR) is used to determine information from light emitted by an emitter, reflected by an object, and detected by a detector. The information includes data associated with the object, such as a range to the object, velocity of the object, and the like. In a time-of-flight (TOF) LiDAR system, the detector is a photodetector that receives the light reflected by the object. The detector can be a solid state photodetector, a photomultiplier, or any combinations thereof.

BRIEF DESCRIPTION OF THE FIGURES

FIG. 5 shows an example of a LiDAR system;

DETAILED DESCRIPTION

Figure 1:
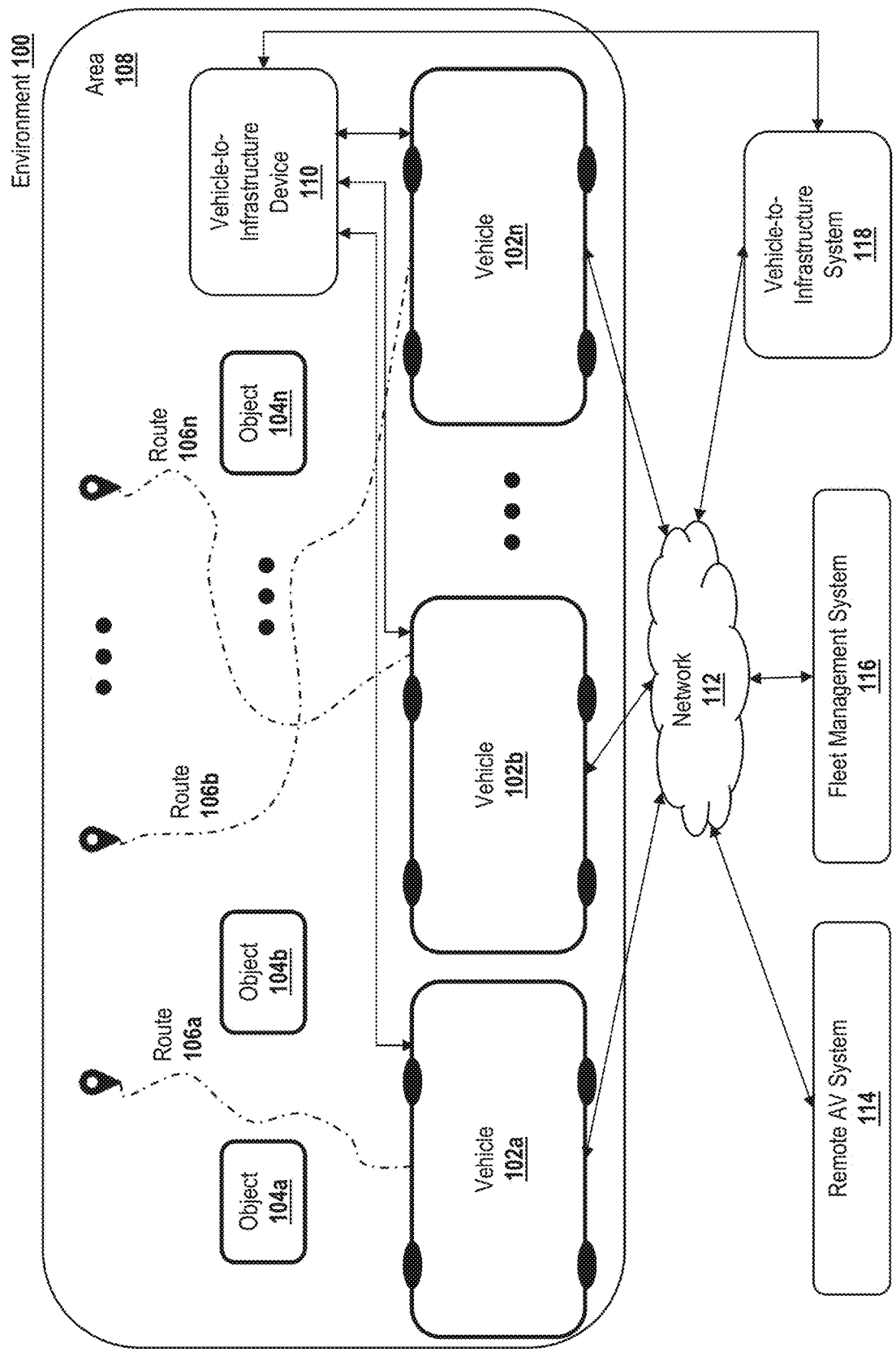
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a dual-mode silicon photomultiplier (SiPM) based time-of-flight (ToF) LiDAR. Generally, a SiPM based time-of-flight (ToF) LiDAR includes one or more SiPM devices (pixels) that capture reflections (optical photons) from the environment. An SiPM device according to the present techniques is operable to detect both high flux signal returns and low flux signal returns. A first anode current output represents information captured in response to a low flux event (return signal). In examples, low flux conditions are conditions with less than hundreds of photons detected. A second anode current output represents information captured in response to a high flux event. In examples, high flux conditions are conditions with substantially greater than one-thousand photons detected. In embodiments, the SiPM device is coupled with readout circuitry that obtains an output from the first anode and the second anode.

By virtue of the implementation of systems, methods, and computer program products described herein, techniques for the dual mode SiPM based LiDAR enables a high dynamic range (DR) with an provides accurate return signal intensity and object reflectivity information. SiPMs are commonly subjected to saturation. The present techniques enable the determination of intensity in the presence of sensor saturation. The present techniques increases the dynamic range of SiPM using a sub-microcell architecture without increasing a total number of microcells.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited look ahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
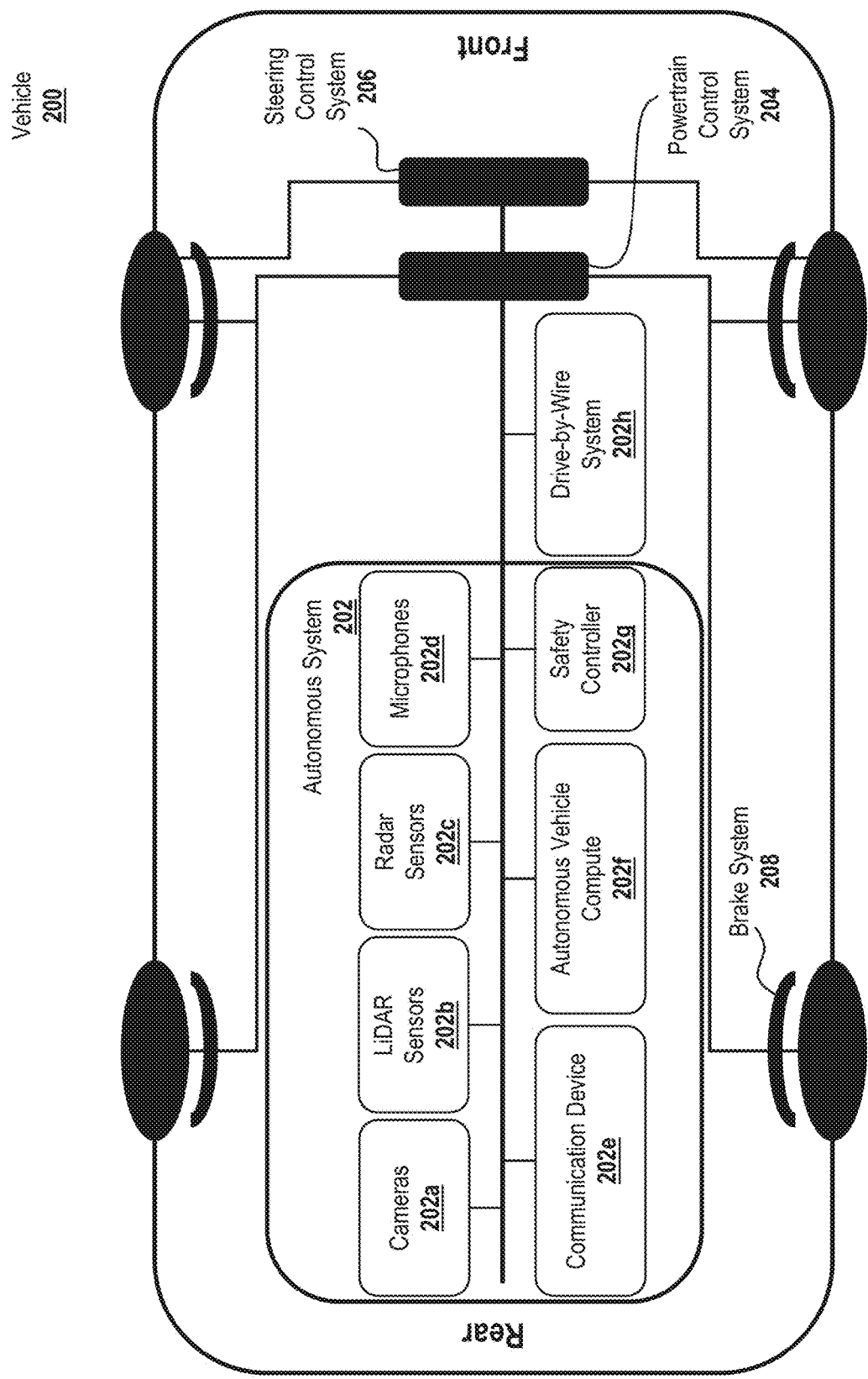
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
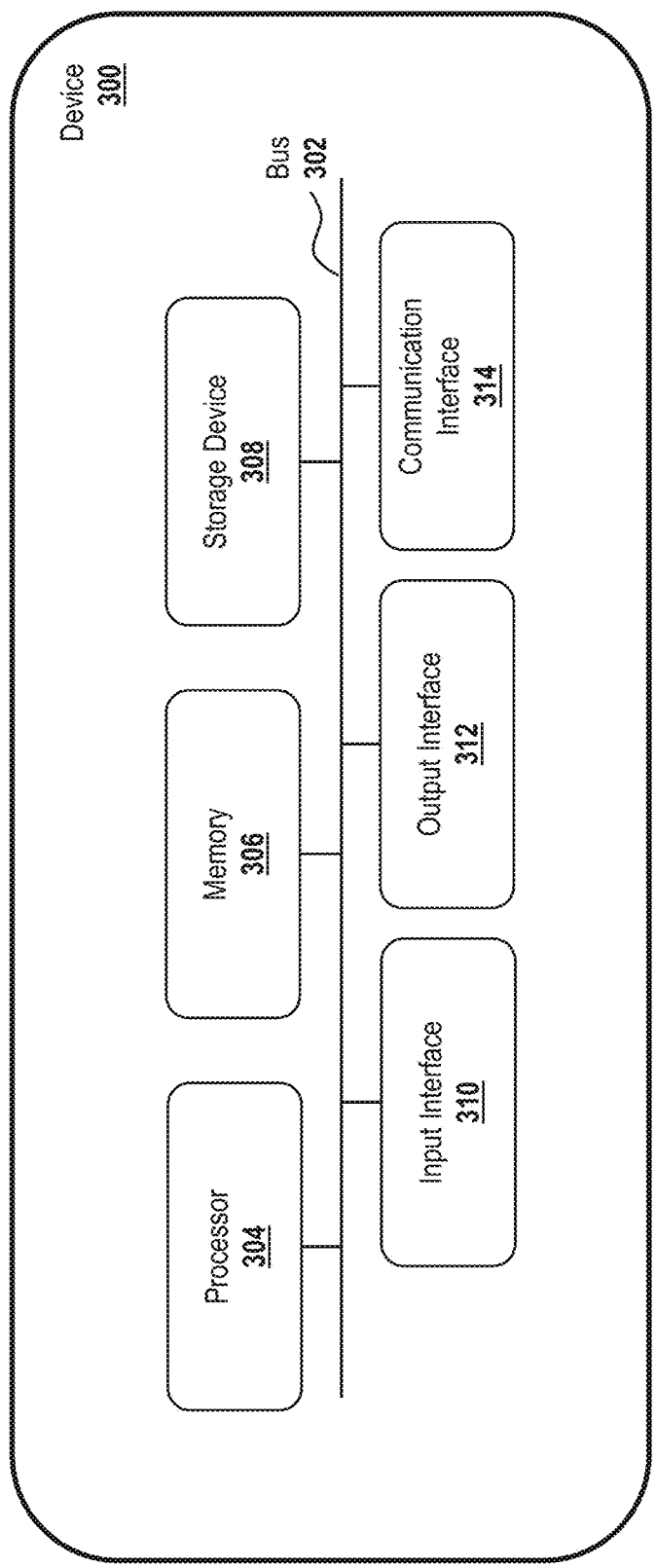
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). The LiDAR sensors 202b may be a SiPM based Time-of-flight (TOF) LiDAR. LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d include at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 306 and/or storage device 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage device 308 from another computer-readable medium or from another device via communication interface 314. When executed, software instructions stored in memory 306 and/or storage device 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage device 308 includes data storage or at least one data structure (e.g., a database and/or the like). Device 300 is capable of receiving information from, storing information in, communicating information to, or searching information stored in the data storage or the at least one data structure in memory 306 or storage device 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
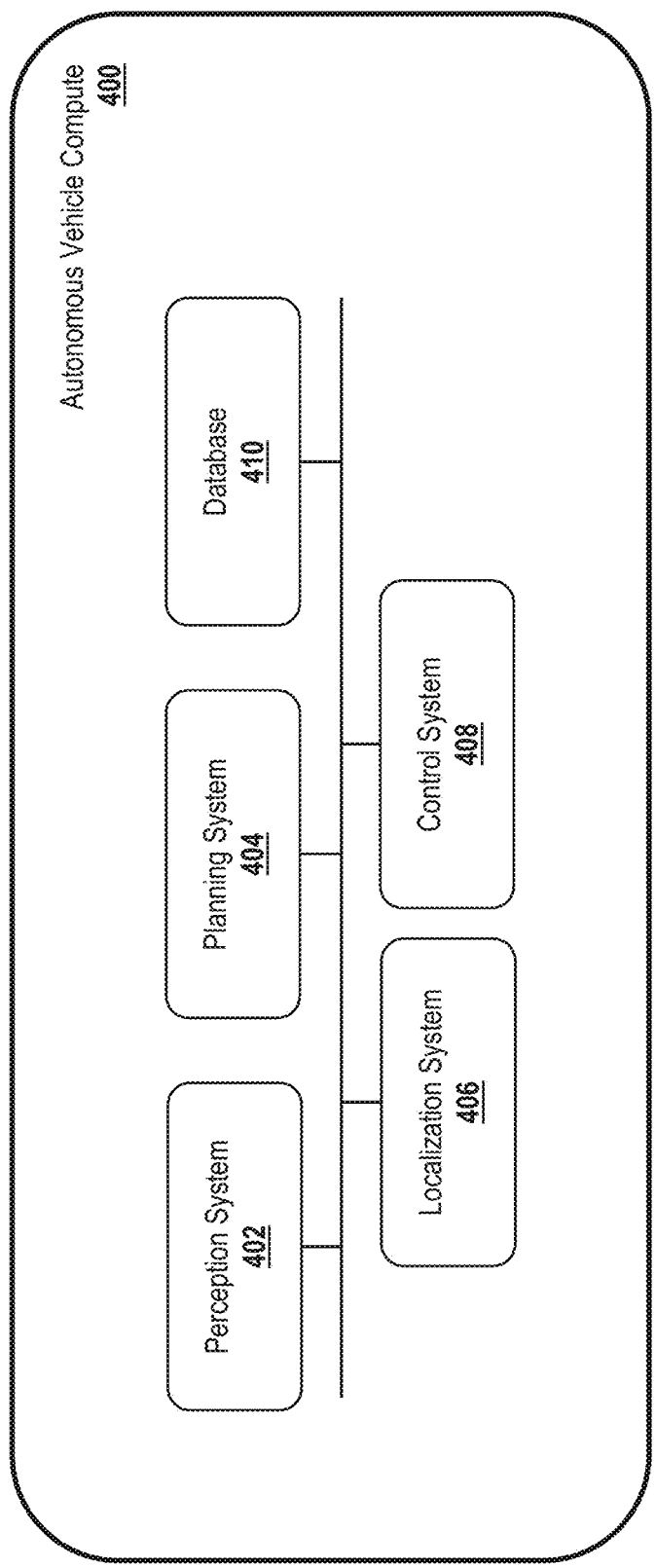
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

FIG. 5 shows an example of a LiDAR system 502. The LIDAR system 502 includes a number of LiDAR sensors (e.g., LiDAR sensors 202b of FIG. 2). The LiDAR system 502 emits light 504a-c from one or more light emitters 506 (e.g., laser transmitter). Light emitted by a LiDAR system is typically not in the visible spectrum; for example, infrared light is often used. Some of the light 504b emitted encounters a physical object 508 (e.g., a vehicle) and reflects back to the LiDAR system 502. The LiDAR system 502 also has one or more light detectors 510 (e.g. photodiode, pin photodiode, APD, SiPM, SPAD, or any combinations thereof), which detect the reflected light. In an embodiment, one or more data processing systems associated with the LiDAR system generates an image 512 representing the field of view 514 of the LiDAR system. The image 512 includes information that represents the boundaries and reflectivity 516 of a physical object 508. In this way, the image 512 is used to determine the boundaries 516 of one or more physical objects near an AV.

Figure 6:
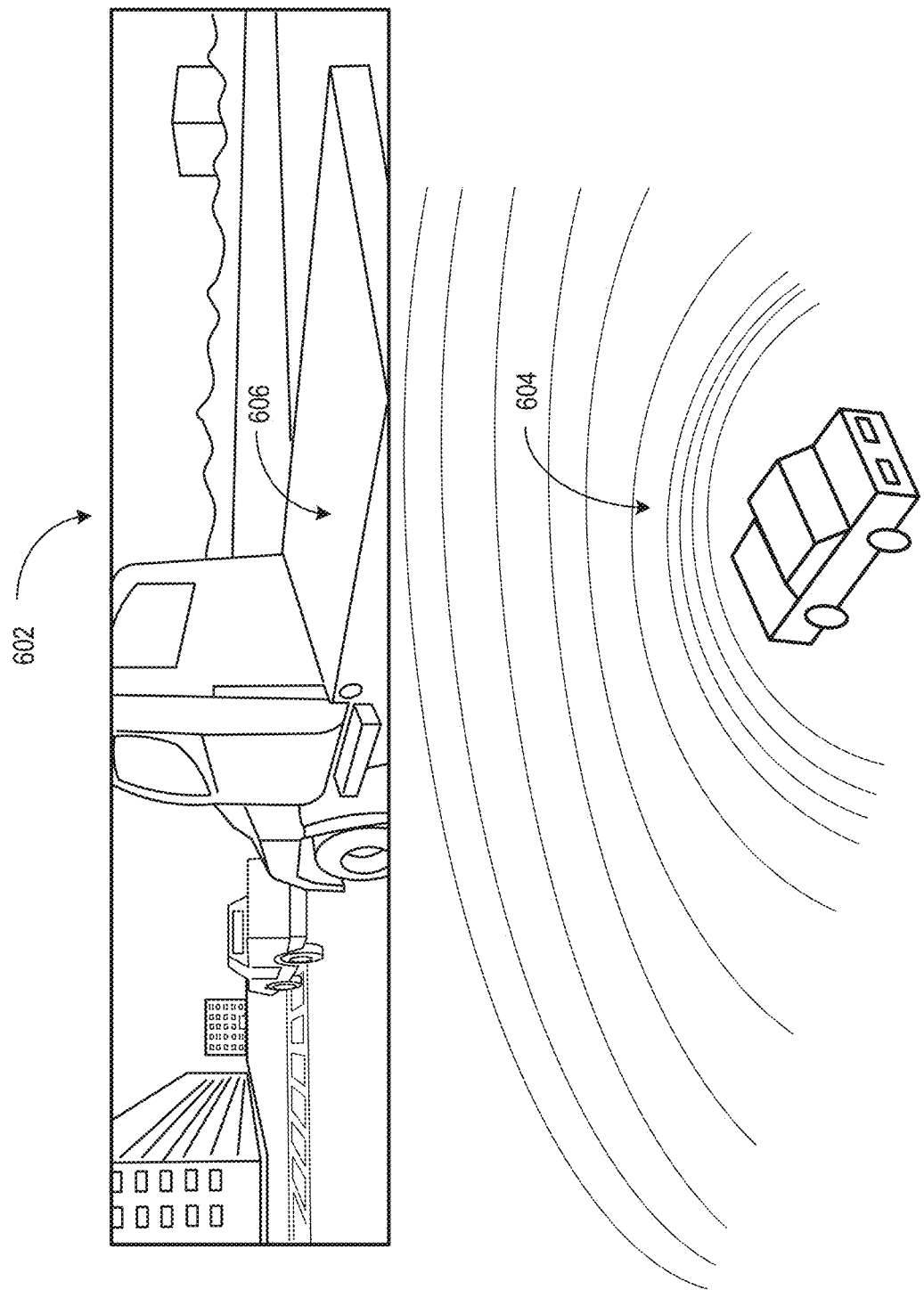
FIG. 6 shows the LiDAR system in operation.

FIG. 6 shows the LiDAR system 502 in operation. In the example of FIG. 6, a vehicle receives both camera system output in the form of an image 602 and LiDAR system output in the form of LiDAR data points 604. In use, the data processing systems of the vehicle 102 compares the image 602 to the data points 604. In particular, a physical object 606 identified in the image 602 is also identified among the data points 604. In this way, the vehicle 102 perceives the boundaries of the physical object based on the contour and density of the data points 604.

Figure 7:
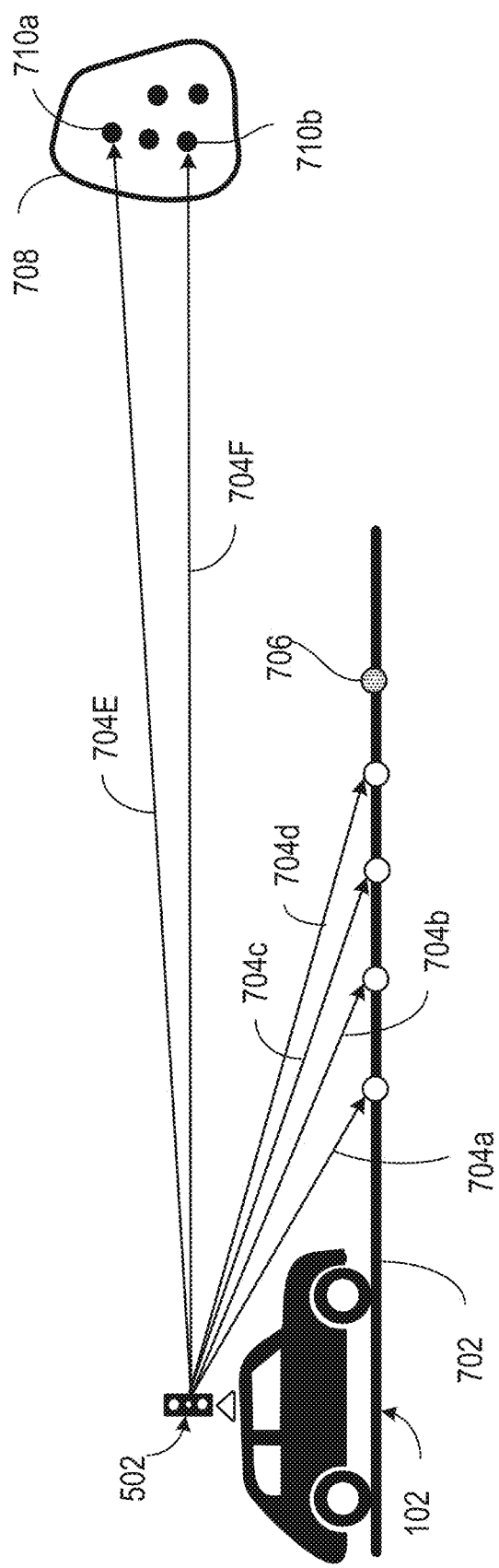
FIG. 7 shows the operation of the LiDAR system in additional detail.

FIG. 7 shows the operation of the LiDAR system 602 in additional detail. As described above, the vehicle 102 detects the boundary and reflectivity of a physical object based on characteristics of the data points detected by the LiDAR system 602. As shown in FIG. 7, a flat object, such as the ground 702, will reflect light 704a-d emitted from a LiDAR system 602 in a consistent manner. As the vehicle 102 travels over the ground 702, the LiDAR system 602 will continue to detect light reflected by the next valid ground point 706 if nothing is obstructing the road. However, if an object 708 obstructs the road, light 704e-f emitted by the LiDAR system 602 will be reflected from points 710a-b in a manner inconsistent with the expected consistent manner. From this information, the vehicle 102 can determine that the object 708 is present.

Figure 8:
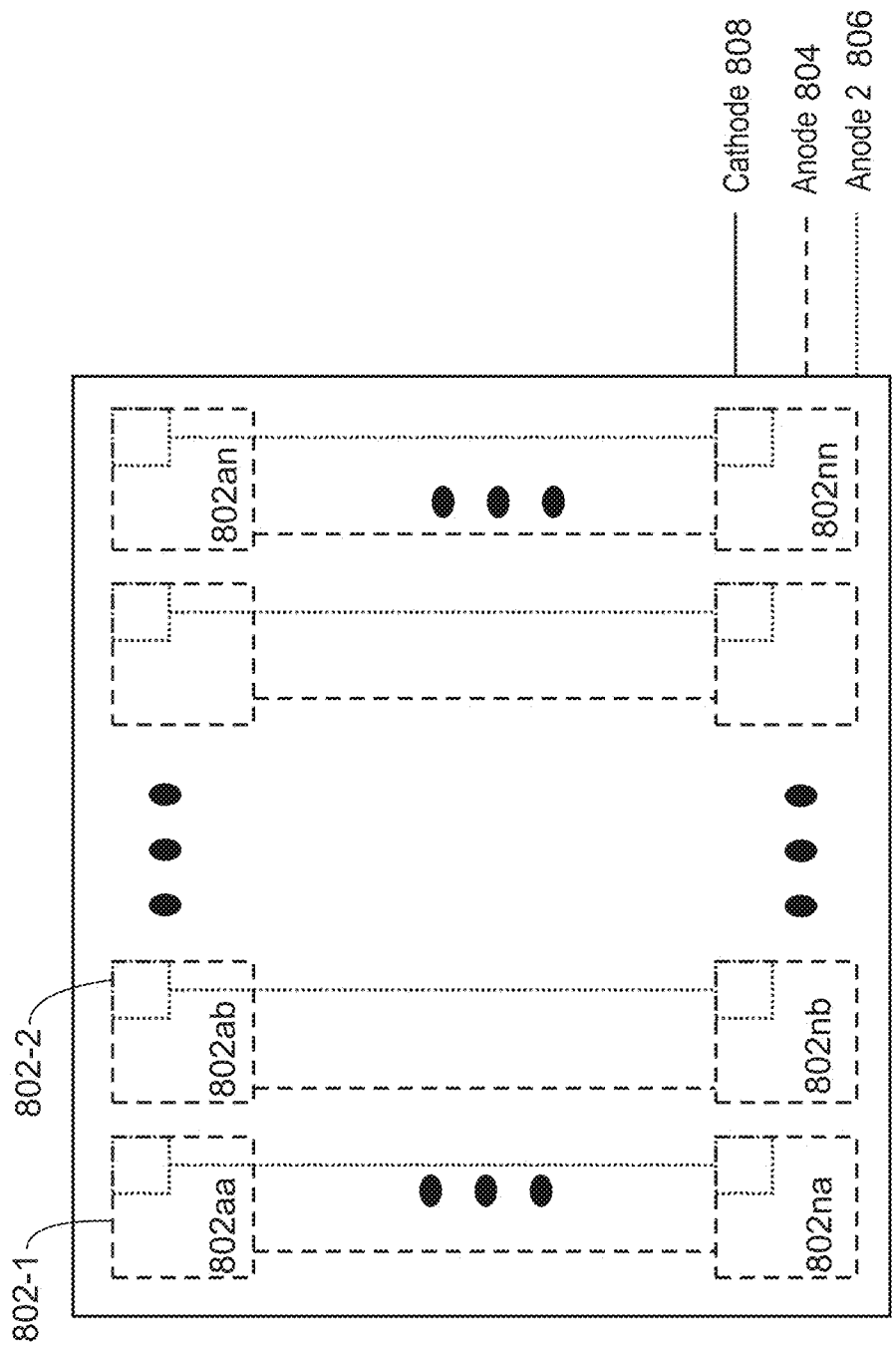
FIG. 8 is a diagram of a silicon photomultiplier (SiPM) device with a plurality of pixels.

FIG. 8 is a diagram of a silicon photomultiplier (SiPM) device 800 with a plurality of microcells 802aa-802an (referred to individually as microcell 802 and collectively as microcells 802). The SiPM device 800 is a pixelated photodetector that senses, times, and quantifies low-light signals down to the single-photon level. The SiPM device 800 includes a number of microcells 802 in an array that share a common output, cathode 808. In the example of FIG. 8, each device 800 includes a first anode 804, a second anode 806 and a cathode 808. Each microcell 802 includes two sub-regions. The sub-region 802-1 is a single photon avalanche diode (SPAD) with internal gain. The sub-region 802-2 is a photodiode or pin-diode, without internal gain. In the example of FIG. 8, the sub-regions 802-1 are connected and share a common output or anode. For example, the sub-regions 802-1 share the anode 804 in the example of FIG. 8. Additionally, on the example of FIG. 8, the sub-regions 802-2 are connected and share a common output or anode. For example, the sub-regions 802-2 share the anode 806 in the example of FIG. 8.

In embodiments, the anode 804 produces a output pulse (current) in response to photons detected at sub-region 802-1 and captures low light level (e.g., less than 100 photons) signals. During the low light levels, the anode 806 output pulse (current) is dominated by readout electronic noise (and or micro-cell intrinsic noise) that prevents reliable output measurement from the anode 806 during low light levels. In examples, the sub-region (microcell) 802-1 is a SPAD that is able to detect single photons providing short duration current pulse. In examples, the anode 804 output the current pulse that is synchronous with the photon arrival time.

Generally, a photodiode operated in Geiger mode employs a mechanism of breakdown to achieve a high gain and is referred to as a SPAD. In operation, the anode 804 captures accurate information at a low light level. For example, the intensity of the captured information is obtained through the anode, where a number of output current pulses from sub-region 802-1 are accumulated within a predefined time period. While the avalanche recovery circuit is quenching the avalanche and restoring bias, the SPAD does not detect further photon arrivals. Photons that reach the SiPM device during this brief period are not detected or outputs less current (total charge) at a smaller gain. As the number of photons increases, the current output by anode 804 begins to saturate. The present techniques enable a second anode 806 that is able to capture information during high flux events when the first anode 804 output is saturated.

In embodiments, the anode 806 produces output pulse (current) in response to photons detected at sub-region 802-2 and captures high light level (e.g., substantially greater than 100 photons) signals. During high light levels, the anode 804 is saturated, where the saturation prevents reliable output from the anode 804. In embodiments, the anode 806 produces a current output for intensity or reflectivity measurement, where the sub-region (microcell) 802-2 is a photodiode or pin-diode, without an internal gain. In examples, the anode 806 has a lower sensitivity when compared with the anode 804, and is used to detect high light levels. Thus, in embodiments the anode 806 output is accurately responsive to higher levels of light when compared to the anode 804.

In embodiments, the sub-region 802-2 is a photodiode (PD) type sub-pixel that occurs in each or some of the SPAD microcell of the SiPM device 800. In embodiments, the two anode outputs 804 and 806 in each SiPM pixel are used at a high and low flux (return optical power) measurement for intensity/reflectivity information. For ease of description, the microcells are illustrated as being of a same size and arranged in a rectangular pattern. However, the microcells according to the present techniques can be of any size and shape. For example, depending on the implementation, the size of a microcell varies from 1 μm to 100 μm and the number of microcells per device ranges from several hundreds to several tens of thousands. In examples, the SiPM pixel 800 is a series combination of a single photon avalanche photodiode (SPAD) (e.g., sub-region 802-1), and a quenching resistor or quenching circuit. Typically, the low return light signal is reflected from an object at a long distance, while a high return signal is reflected from a near-range object. In embodiments, the SPAD includes a dark trigger or event trigger. The SPADs (microcells) are connected in parallel, and each microcell detects photons independently. The anode 804 produces an output current with internal gain, while the anode 806 produces a photocurrent with little to no internal gain. In examples, all microcells share a common cathode output 808.

In examples, readout circuitry incudes an external circuit that calculates the optical power of the output (e.g. peak, area, and shape of the analog signal) and the arrival time (e.g. measuring the time of the rising edge of the SiPM output) associated with the captured information. In an embodiment, the external circuit counts the number of fired pixels (e.g. active SiPM pixels). In an embodiment, the external circuit measures the start time of the pulse output by the pixels to obtain the arrival time of the photon. In examples, LIDAR systems (e.g., LiDAR system 502 of FIG. 5) employ monochromatic laser pulses and can measure both the intensity and time delay of the reflected laser pulse (e.g., return signal). From the intensity and time delay, the LIDAR system can then generate a LIDAR image comprising an array of LIDAR data points (e.g., LIDAR data points 604), each data point including the range (distance from the LIDAR system) and reflectivity of a detected object in the field around the system. In embodiments, the LiDAR image is a point cloud.

The block diagram of FIG. 8 is not intended to indicate that the device 800 is to include all of the components shown in FIG. 8. Rather, the device 800 can include fewer or additional components not illustrated in FIG. 8 (e.g., optical trench between microcells 802, additional optical trench inside microcell 802 (between regions 802-1 and 802-2), microcell-based circuit, anodes, cathodes, differently shaped microcells and pixels, etc.). The device 800 may include any number of additional components not shown, depending on the details of the specific implementation. Furthermore, portions of the device other described functionalities may be partially, or entirely, implemented in hardware and/or in a processor. For example, the control or functionality may be implemented with an application specific integrated circuit, in logic implemented in a processor, in logic implemented in a specialized graphics processing unit, or in any other device.

Figure 9:
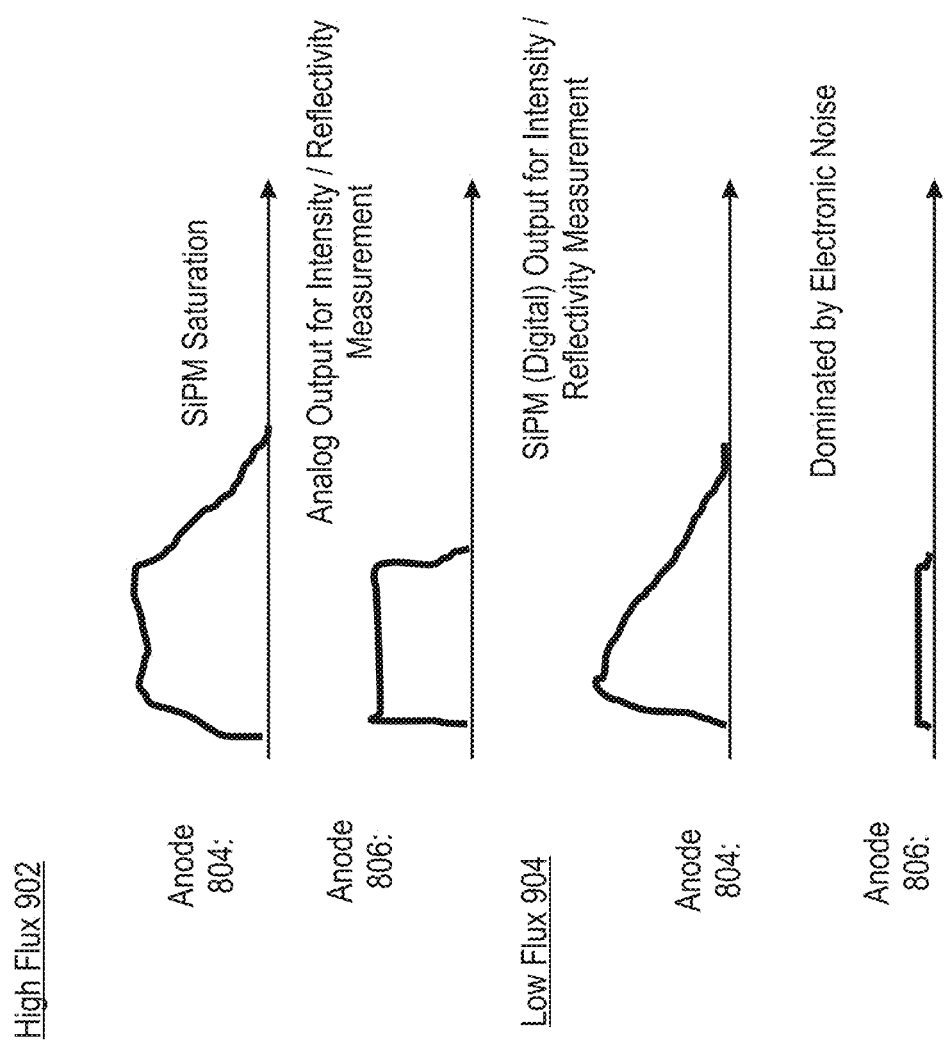
FIG. 9 is an illustration of silicon photomultiplier output during a high flux event and a low flux event.

FIG. 9 is an illustration of silicon photomultiplier output during a high flux event 902 and a low flux event 904. During the high flux event 902, a first anode (e.g., a first anode 804 of FIG. 8) is saturated during the high flux event. The second anode (e.g., a second anode 806 of FIG. 8) is used to capture and output information during a high flux (return optical power) measurement for intensity/reflectivity information when the first anode is saturated. Similarly, during a low flux event, a second anode (e.g., the second anode 806 of FIG. 8) is dominated by readout noise. In examples, the second anode 806 is dominated by intrinsic noise at low signal levels. The first anode 804 is used for a low flux (return optical power) measurement for intensity/reflectivity information when the second anode is dominated by readout noise. In this manner, the SiPM device according to the present techniques provides two outputs for both low flux and high flux events. In embodiments, the present techniques include a first anode and a second anode with different doping profiles, bias voltages, internal gain, filter bandwidths, or any combinations thereof. In an example, the first sub-region and the second sub-region have a same doping profile, a same bias voltage, a same optical pass window, or any combinations thereof when generating current. In another example, the first sub-region and the second sub-region have a different doping profile, a different bias voltage, a different optical pass window, or any combinations thereof when generating current.

Figure 10:
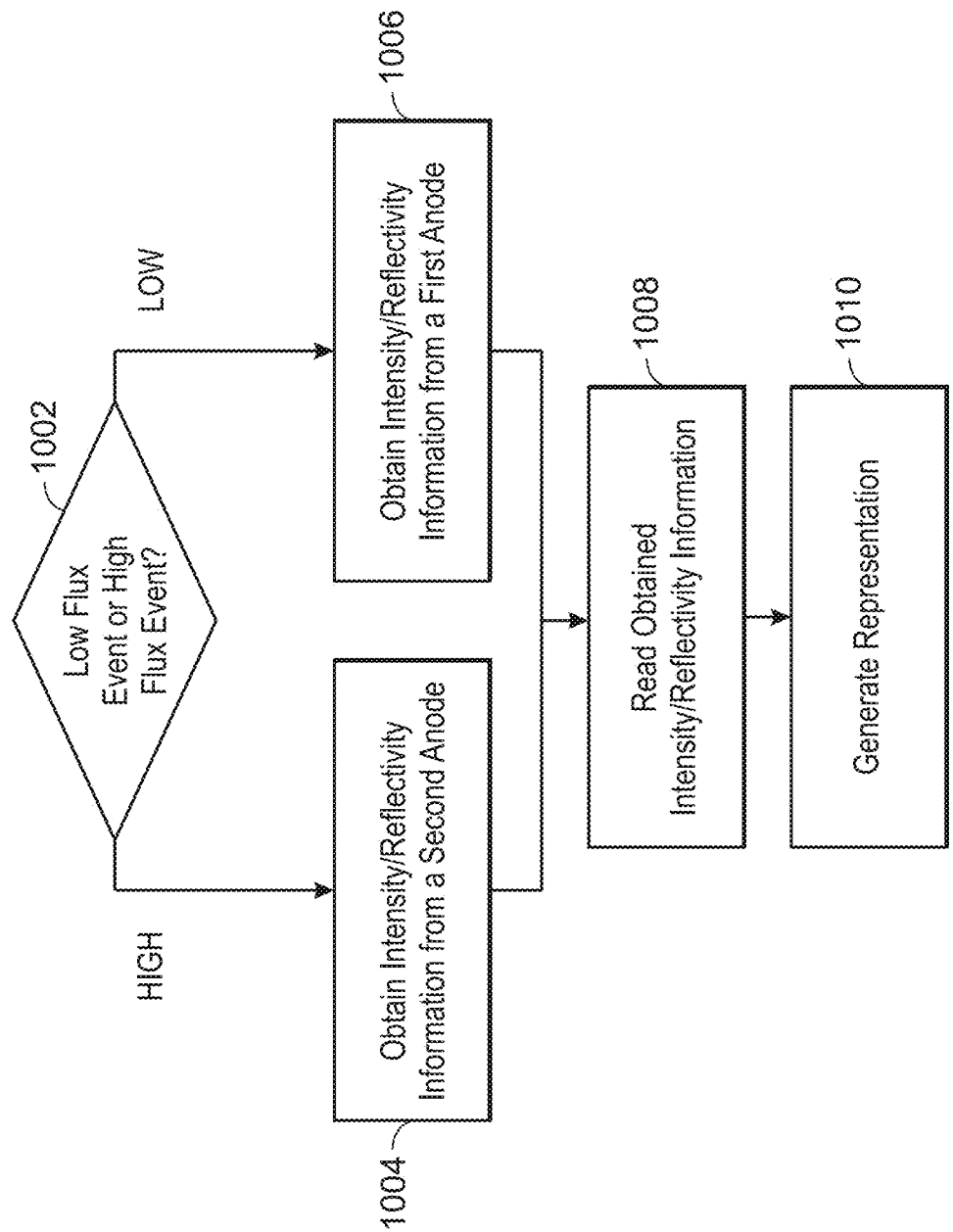
FIG. 10 is a process flow diagram of a process for generating output via a dual-mode silicon photomultiplier (SiPM) based LiDAR.

FIG. 10 is a process flow diagram of a process 1000 for a dual-mode silicon photomultiplier (SiPM) based LiDAR readout circuitry. In embodiments, the process 1000 is implemented at external readout circuitry. In embodiments, the process 100 is implemented at each microcell of a dual-mode SIPM device.

At block 1002, it is determined if the output current of both anodes correspond to a low flux event or a high flux event. If the output current corresponds to a high flux event, process flow continues to block 1004. If the output current corresponds to a low flux event, process flow continues to block 1006.

At block 1004, output is obtained from a second anode (e.g., anode 806). The second anode is configured for an analog or digital output that captures intensity or reflectivity information in a high flux event. In embodiments, the analog output from the second anode could be a photodiode, pin-diode, or even APD without or with small gain. In examples, high flux events are conditions with substantially greater than 100 photons detected per pixel. At block 1006, output is obtained from a first anode (e.g., anode 804). The first anode is configured for a digital or analog output that captures intensity and reflectivity information during low flux events. In examples, low flux events are conditions with less than 100 photons detected per pixel.

At block 1008, the captured intensity and reflectivity information is read to generate an output signal. In examples, readout circuitry processes the captured information to generate an output signal. For example, the output is a current produced by the first anode or the second anode. At block 1010, a data representation is generated based on the output signal. In an example, the data representation is a point cloud. The present techniques enable a more accurate point cloud representation. In examples, SiPM device saturation is avoided, thereby capturing information in a wide dynamic range of object return signal where data capture is traditionally limited.

The process flow diagram of FIG. 10 is not intended to indicate that the blocks of the example process 1000 are to be executed in any order, or that all of the blocks are to be included in every case. Further, any number of additional blocks not shown may be included within the example process 1000, depending on the details of the specific implementation.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A dual mode silicon photomultiplier (SiPM) device, comprising:
   one or more SiPM pixels, wherein a plurality of microcells are connected in parallel and at least one microcell of the plurality of microcells comprises:
   a first sub-region, wherein a first photodiode of the at least one microcell is operated with a first internal gain;
   a second sub-region, wherein a second photodiode of the at least one microcell is operated with a second internal gain, wherein the second internal gain is smaller than the first internal gain;
   a first anode to generate current from the first sub-region in response to a low flux event in an environment;
   a second anode to generate current from the second sub-region in response to a high flux event in the environment; and
   a common cathode to output current generated from the first sub-region, the second sub-region, or any combinations thereof.

2. The device of claim 1, wherein the first anode, the second anode, the common cathode, or any combinations thereof are coupled with external readout circuitry that obtains current generated by the device.

3. The device of claim 1, wherein a microcell is coupled with internal readout circuitry that is summed and output by the first anode, the second anode, and the common cathode.

4. The device of claim 1, wherein the first anode, the second anode, and the common cathode are coupled with external circuitry that generates a data representation based on the output.

5. The device of claim 1, wherein the output is obtained from the first anode, and the output is an SiPM digital or analog output.

6. The device of claim 1, wherein the output is obtained from the first anode, and the output is generated, at least in part, by applying a gain to the captured reflections.

7. The device of claim 1, wherein the output is obtained from the second anode, and the output is a digital or analog output.

8. The device of claim 1, wherein the output is obtained from the second anode, and the output is generated without applying a gain to the captured reflections.

9. The device of claim 1, wherein a dynamic range of the device is greater than a dynamic range associated with the first anode or a dynamic range associated with the second anode.

10. The device of claim 1, wherein the first sub-region and the second sub-region have a same doping profile, a same bias voltage, a same optical pass window, or any combinations thereof.

11. The device of claim 1, wherein the first sub-region and the second sub-region have a different doping profile, a different bias voltage, a different optical pass window, or any combinations thereof.

12. A Laser Detection and Ranging (LiDAR) array, comprising:
an emitter, wherein the emitter emits light that is reflected in an environment;
a dual-mode silicon photomultiplier (SiPM) device that detects reflections of light emitted by the emitter and comprises a plurality of microcells, at least one microcell of the plurality of microcells comprising:
a first sub-region, wherein a first photodiode of the at least one microcell is operated with a first internal gain;
a second sub-region, wherein a second photodiode of the at least one microcell is operated with a second internal gain, wherein the second internal gain is smaller than the first internal gain;
a first anode to generate current from the first sub-region in response to a low flux event in an environment;
a second anode generate current from the second sub-region in response to a high flux event in the environment; and
a common cathode to output current generated from the first sub-region, the second sub-region, or any combinations thereof.

13. The array of claim 12, wherein the first anode, the second anode, the common cathode, or any combinations thereof are coupled with external readout circuitry that obtains current generated by the dual mode SiPM device.

14. The array of claim 12, wherein a microcell is coupled with internal readout circuitry that is summed and output by the common cathode.

15. The array of claim 12, wherein the first anode, the second anode, and the common cathode are coupled with external circuitry that generates a data representation based on the output.

16. The array of claim 12, wherein the output is obtained from the first anode, and the output is an SiPM digital or analog output.

17. The array of claim 12, wherein the output is obtained from the first anode, and the output is generated, at least in part, by applying a gain to the captured reflections.

18. The array of claim 12, wherein the output is obtained from the second anode, and the output is a digital or analog output.

19. The array of claim 12, wherein the output is obtained from the second anode, and the output is generated without applying a gain to the captured reflections.

20. A method, comprising:
determining, with at least one processor, a lighting condition of an environment;
generating, with the at least one processor, an output current in response to captured light in the environment, wherein a first anode outputs current in response to a low flux event and a second anode outputs current in response to a high flux event;
outputting, with the at least one processor, the output current generated from the first anode or the second anode at a cathode, wherein a first internal gain from a first photodiode of a microcell is applied to the output current from the first anode, and a second internal gain from a second photodiode of the microcell is applied to the output current from the second anode, wherein the second internal gain is smaller than the first internal gain; and
creating, with the at least one processor, a data representation from the output current, wherein the data representation corresponds to at least a portion of the environment.

21. The method of claim 20, wherein the first anode, the second anode, the cathode, or any combinations thereof are coupled with external readout circuitry that obtains current generated by dual mode a silicon photomultiplier (SiPM) device.

22. The method of claim 20, wherein a microcell is coupled with internal readout circuitry that is summed and output by the cathode.

* * * * *